(12) United States Patent
Wei et al.

(10) Patent No.: US 11,631,976 B2
(45) Date of Patent: Apr. 18, 2023

(54) METHOD FOR DAMPING HARMONICS

(71) Applicant: VESTAS WIND SYSTEMS A/S, Aarhus N (DK)

(72) Inventors: Mu Wei, Solbjerg (DK); Dan Wu, Risskov (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 146 days.

(21) Appl. No.: 16/956,474

(22) PCT Filed: Nov. 20, 2018

(86) PCT No.: PCT/DK2018/050303
§ 371 (c)(1),
(2) Date: Jun. 19, 2020

(87) PCT Pub. No.: WO2019/120398
PCT Pub. Date: Jun. 27, 2019

(65) Prior Publication Data
US 2020/0350763 A1    Nov. 5, 2020

(30) Foreign Application Priority Data

Dec. 19, 2017 (DK) .......................... PA 2017 70958

(51) Int. Cl.
*H02J 3/01* (2006.01)
*F03D 7/04* (2006.01)
(Continued)

(52) U.S. Cl.
CPC ................ *H02J 3/01* (2013.01); *F03D 7/048* (2013.01); *H02J 3/00125* (2020.01);
(Continued)

(58) Field of Classification Search
CPC .......... H02J 3/01; H02J 3/241; H02J 3/00125; H02J 3/1828; H02J 3/22; H02J 2300/28; F03D 7/048; H02M 1/12; F05B 2270/337
(Continued)

(56) References Cited

U.S. PATENT DOCUMENTS 4,670,863 A * 6/1987 Sallas ...................... G01V 1/04
367/189
2013/0134710 A1    5/2013 Yuan et al.
(Continued)

FOREIGN PATENT DOCUMENTS

CN   107332261 A   11/2017
CN   107465210 A   12/2017
(Continued)

OTHER PUBLICATIONS

Barrero-Gonzalez Fermin et al, "Photovoltaic inverter with smart grid functions", 2016 IEEE 16th International Conference on Environment and Electrical Engineering (EEEIC), IEEE, Jun. 7, 2016 (Jun. 7, 2016), pp. 1-6.
(Continued)

*Primary Examiner* — Daniel Kessie
*Assistant Examiner* — Dru Parries
(74) *Attorney, Agent, or Firm* — Patterson + Sheridan, LLP

(57) ABSTRACT

Harmonics of a power output of a power plant at a point of common coupling between the power plant and a utility grid, wherein the power plant comprises a plurality of energy production units. The method comprises determining an electrical characteristic at the point of common coupling; determining the electrical characteristic at an output terminal of each of the energy production units and dispatching a control signal to at least one of the energy production units to control the electrical characteristic at an output terminal (Continued)

of the respective energy production units. The control signal is based on the measurement of the electrical characteristic at the point of common coupling and arranged for damping the harmonic of the power output of the power plant at the point of common coupling, wherein the control signal is determined on the basis of a predetermined prioritizing sequence of said electrical characteristic.

20 Claims, 8 Drawing Sheets

(51) Int. Cl.
*H02M 1/12* (2006.01)
*H02J 3/00* (2006.01)
*H02J 3/18* (2006.01)
*H02J 3/22* (2006.01)
*H02J 3/24* (2006.01)
*H02J 3/46* (2006.01)
*H02J 3/48* (2006.01)
*H02J 3/50* (2006.01)
*H02J 3/38* (2006.01)

(52) U.S. Cl.
CPC ............ *H02J 3/1828* (2013.01); *H02J 3/22* (2013.01); *H02J 3/241* (2020.01); *H02J 3/38* (2013.01); *H02J 3/381* (2013.01); *H02J 3/472* (2020.01); *H02J 3/48* (2013.01); *H02J 3/50* (2013.01); *H02M 1/12* (2013.01); *F05B 2270/337* (2013.01); *H02J 2300/20* (2020.01); *H02J 2300/24* (2020.01); *H02J 2300/28* (2020.01)

(58) Field of Classification Search
USPC .......................................... 307/153
See application file for complete search history.

(56) References Cited

U.S. PATENT DOCUMENTS

| | | |
|---|---|---|
| 2013/0207393 A1 | 8/2013 | Letas |
| 2016/0134114 A1 | 5/2016 | Gupta et al. |
| 2017/0176965 A1* | 6/2017 | Martin Lloret ........ G06Q 50/06 |

FOREIGN PATENT DOCUMENTS

| | | |
|---|---|---|
| EP | 2209200 A2 | 7/2010 |
| WO | 2014202077 A1 | 12/2014 |
| WO | 2015078471 A1 | 6/2015 |
| WO | 2019120398 A1 | 6/2019 |

OTHER PUBLICATIONS

F. Blaabjerg et al: "Overview of Control and Grid Synchronization for Distributed Power Generation Systems", IEEE Transactions on Industrial Electronics, vol. 53, No. 5, Oct. 2, 2006 (Oct. 2, 2006), pp. 1398-1409.
PCT Notification of Transmittal of the International Search Report and the Written Opinion of the International Searching Authority, or the Declaration. Application: PCT/DK2018/050303, dated Jan. 30, 2019. pp. 1-15.
Danish Patent and Trademark Office, 1st technical examination of patent application PA201770958, dated May 24, 2018.
Intellectual Property India, Government of India, Examination Report under Sections 12 & 13 of Patents Act, 1970 and the Patents Rules, 2003 for Application 202017025229 dated Mar. 24, 2022.

* cited by examiner

| Situation | Prioritization possibility (priority high→low) | H calculation | Comments |
|---|---|---|---|
| a | (P→Q→H) | $H = \sqrt{S^2 - P^2 - Q^2}$ | P and Q references come from TSO/DSO or operator. Thus total H reference is calculated based on P and Q references |
| b | (P→H→Q) | H comes from TSO/DSO or operator | P and H references come from TSO/DSO or operator. Thus Q reference should use the calculation $Q = \sqrt{S^2 - P^2 - H^2}$ |
| c | (Q→P→H) | $H = \sqrt{S^2 - P^2 - Q^2}$ | P and Q references come from TSO/DSO or operator. Thus total H reference is calculated based on P and Q references. |
| d | (Q→H→P) | H comes from TSO/DSO or operator | Q and H references come from TSO/DSO or operator. Thus P reference should use the calculation $P = \sqrt{S^2 - Q^2 - H^2}$ |
| e | (H→P→Q) | H comes from TSO/DSO or operator | H and P references come from TSO/DSO or operator. Thus Q reference should use the calculation $Q = \sqrt{S^2 - P^2 - H^2}$ |
| f | (H→Q→P) | H comes from TSO/DSO or operator | H and Q references come from TSO/DSO or operator. Thus P reference should use the calculation $P = \sqrt{S^2 - Q^2 - H^2}$ |

FIG. 4

METHOD FOR DAMPING HARMONICS

FIELD OF THE INVENTION

The present invention relates to damping harmonics (H) of a power output of a power plant at a point of common coupling (PCC) between the power plant and a utility grid.

BACKGROUND OF THE INVENTION

Power plants comprise energy production units for generating power. The power is normally fed into a utility grid, where users are connected and consume the power. The utility grid is also called the transmission system, power grid, electrical grid or simply the grid, it interconnects power plants, which produce power, with consumers such as buildings and homes.

Power plants may be in the form of renewable power plants comprising wind turbines and/or solar cells (photovoltaic cell). The power plants are normally controlled to deliver a certain amount of power according to a power reference at the Point of Common Coupling (PCC) between the power plant and the utility grid. At the PCC the harmonic distortion of the power fed into the utility grid, among others, should be controlled to be within the limits specified e.g. by a grid code or the utility grid operator.

In the following, energy production units, power generating units and power producing units are intended to have the same meaning. A wind power plant is also known as a wind farm, wind park or a wind turbine park. Wind turbine generators are also known simply as turbines, wind turbines or WTGs. Control of the harmonics is intended to have the same meaning as to damp the harmonics.

A conventional wind power plant (WPP) comprises a plurality of wind turbines delivering an electricity to an internal network which is connected to the utility grid at the point of common coupling. The wind turbines operate and deliver power in accordance with set points defining electrical properties that the turbine should comply with. In an example, the set point may be an active power, reactive power, current and/or voltage set point. The set points may be determined and dispatched from a power plant controller (PPC) which is a central unit which determines and dispatches set points to the plurality of wind turbines. The set points may be determined based on a reference defining for the electrical properties which the WPP should comply with. The utility grid is operated by a transmission system operator (TSO) (also called a utility grid operator).

Harmonics, in general, are undesired multiples of the fundamental frequency. In power systems, harmonics are defined as voltage/currents at frequencies that are multiple of the fundamental frequency 50 Hz (for Europe). The harmonic order is 100 Hz, 150 Hz, 200 Hz etc. Usually, the orders of the harmonics are specified by the harmonics number; e.g. 3. Order harmonics corresponds to the harmonics with frequency 150 Hz. The harmonics results in a distortion of the shape of the voltage and current sinusoids and in an undesired increase in current. This additional current will increase losses in the electrical distributions equipment, cables, transformers etc. and in general lower the system power factor. Harmonic distortion is a measurement of the amount of deviation from a pure sinusoidal waveform of the voltage/current.

In the following, harmonics and harmonics distortion are related to current and voltage harmonics of the power output of a power plant. In power systems the harmonics distortion of the power fed into the utility grid, among others, should be controlled to be within the limits specified e.g. by a grid code or the utility grid operator. A harmonic current reference, typicality set by the TSO, is as measured for the desired value of the harmonics of the power output of the power plant.

The harmonics distortion on the utility grid is caused due to many reasons, for example, non-linear loads connected to grid, and variations of harmonic grid impedance due to switching of grid-connected elements such as load, capacitors, reactor banks and/or generators of power producing units connected to the utility grid. Use of passive filters for filtering undesired harmonics is possible. However, passive filters are expensive and require relatively large space.

Harmonics distortion may particularly be generated by wind turbine generators, solar power generators, hydroelectric generators or generators or other power-producing units. Since severe harmonic grid distortion is a problem that may cause instability, there is a need for a method for reducing or controlling harmonics distortion in connection with grid connected power producing units. Harmonics generally result in grid integration compliance issues.

Currently, the harmonics is only controlled at wind turbine level where each wind turbine operates separately to decrease its own output current's harmonics. A central Power Plant Controller PPC may be used for controlling the damping of the harmonics of the power output of the wind power plant. However, the PPC has no regulation for the Total Harmonic Dispatching (THD) of the power plant, which means that the power plant can only perform passive actions when THD is seen at PCC. The THD is a measurement of the harmonics distortion present in the output power of the power plant and is defined as the sum of all of the individual harmonic RMS voltage/current expressed as percentage of the fundamental RMS voltage/current.

THD is an important aspect in wind power plants and power systems in general and should be kept as low as possible.

Accordingly, there is a need to improve the damping of THD of the power output of a power plant. Particularly, there is a need to improve the damping of THD at the PCC of a power plant, comprising a plurality of energy production units.

OBJECT OF THE INVENTION

It is an object of the invention to improve the damping of the harmonics of the power output of a power plant, particularly to improve the damping of THD at the PCC of a power plant.

In general, the invention preferably seeks to alleviate or eliminate one or more of the above-mentioned disadvantages relating to known systems for damping undesired harmonics. In particular, it may be seen as an object of the present invention to provide a method that solves the above mentioned problems relating to harmonic grid distortion, or other problems, of the prior art.

SUMMARY OF THE INVENTION

In a first aspect of the invention there is provided a method for damping harmonics of a power output of a power plant at a point of common coupling PCC between the power plant and a utility grid, wherein the power plant comprises a plurality of energy production units, the method comprising
  determining an electrical characteristic at the point of common coupling determining the electrical characteristic at an output terminal of each of the energy production units, and dispatching a control signal to at least one of the energy production units to control said electrical characteristic at an output terminal of the respective energy production units, wherein said control signal is based on the measurement of the electrical characteristic at the point of common coupling and arranged for damping the harmonics of the power output of the power plant at the point of common coupling, and wherein the control signal is determined on the basis of a predetermined prioritizing sequence of said electrical characteristic.

In the following, the energy production units are also referred to as wind turbines or WTGs for simplification reasons, in order for proper explanation of the advantages of the features according to the present invention, and shall not be construed as limiting the scope of the invention.

Advantageously, determining of the THD at the PCC and dispatching a control signal to each wind turbine, provides a reliable method for ensuring control of the total harmonics current in a power plant. In prior art the harmonics are only controlled at wind turbines level, where each wind turbines operates separately to decrease its own output current's harmonics, not taking into account the harmonic distortion at the PCC. In prior art, the PPC has no regulation for the Total Harmonic Dispatching (THD) of the power plant. Based on the need to improve the damping of THD, the PPC now has the regulation for the THD of the power plant, which means that the power plant can perform active actions when THD is seen at PCC.

Furthermore, a local grid operator may control a wind power plant's harmonics to a desired level in order to contribute a power system level. Measuring the electrical characteristics at the PCC, and subsequently determining the THD at the PCC, the Power Plant Controller PPC may dispatch a control signal to the wind turbines, so as to control the electrical characteristic at an output terminal of the wind turbines, hereby damping the harmonics of the output power at the PCC. In this way the PPC acts as an active component when THD is dampened at the PCC. Thus, the THD is determined and controlled at plant level. The measuring and determining of the THD at the PCC, and subsequently dispatching a control signal to each of the wind turbines to control the wind turbines output, provides a solution for controlling the THD at the PCC, e.g. according to a demand from a grid operator.

The electrical performance without damping harmonics at the PCC generally results in grid integration compliance issues, especially when PV panel in a hybrid power plant are operated together with wind turbine generators. Therefore, it has been seen that a hybrid plant is requested to disconnect due to harmonics. Advantageously, by having the plant level harmonics control and dispatching function, it can enhance not only wind power plant but also hybrid power plant fulfillment of grid integration compliance.

According to the invention, the control signal is determined on the basis of a predetermined prioritizing sequence of the electrical characteristics. By prioritizing is meant that the TSO chooses, or as needed by operations, the prioritizing order of the quantities P (active power), Q (reactive power) and H (harmonics), so as to fulfill the grid requirements.

Advantageously, the use of a predetermined prioritizing sequence enables the PPC to select different priority among the active power, reactive power and harmonics based on the grid requirement/demand. A prioritizing scheme enables a simple calculation of the quantity prioritized, fulfilling the relationship $P^2+Q^2+H^2=S^2$. Advantageously, a prioritising sequence can be set up as requested by the TSO (Transmission System Operator). The output of the prioritizing sequence is the H reference on plant level. Advantageously, the possibility of setting up the prioritizing sequence as requested by the TSO results in an enhanced wind power plant and power plant fulfillment of grid integration compliance.

According to an embodiment, the prioritizing scheme prioritizes active power over reactive power and harmonics of the power output at the point of common coupling.

According to another embodiment, the prioritizing scheme prioritizes reactive power over active power and harmonics of the power output at the point of common coupling.

According to yet another embodiment, the prioritizing scheme prioritizes harmonics of the power output over active power and reactive power at the point of common coupling.

The control signal may, in another embodiment of the invention, be determined on the basis of a Harmonic Current Reference, being set by the TSO. Advantageously, the Harmonic Current Reference is by default set to 0, meaning that the PPC ideally controls the THD at the PCC to 0. Advantageously, the H reference calculated from the prioritizing scheme, is used as a saturation factor to limit the total Harmonic Current Reference.

According to another embodiment, the control signal may be determined on the basis of a Harmonic Current Reference set by the TSO, and a measured Harmonic Current Reference.

Advantageously, comparing the H reference with the measured total harmonics, and subsequently generating a signal $\Delta I_{Hi}$, minimises the error between the H reference and the measured total harmonic.

According to an embodiment, the control signal may be determined by the use of a PI controller. Advantageously, the PI controller may be used for each harmonic order, so as to eliminate the $\Delta I_{Hi}$.

According to another embodiment, the control signal may comprise a current set point, so as to control one or more harmonic order of the harmonics at an output terminal of at least one of the energy production units. Advantageously, this feature enables the control signal to target specific harmonic orders at the wind turbine level.

According to another embodiment, a dispatching block is configured for generating the control signal. The control signal may comprise the current set points, so as to control one or more harmonic orders of the harmonics H, at an output terminal of at least one of the energy production units.

According to another embodiment, the dispatching block is configured for receiving input from a dispatching controller and from the prioritizing sequence of the electrical characteristic.

The energy productions units may, in an embodiment of the invention, comprise wind turbine generators.

According to another embodiment, the energy productions units may comprise photovoltaic cells.

According to an embodiment, the determination of the electrical characteristic at the point of common coupling and/or of the electrical characteristic at an output terminal of each of the energy production units, comprises measuring one or more of, reactive power, active power, voltage, current, power factor at the point of common coupling and/or at the output terminal of each of the energy production units.

According to another embodiment, the determined electrical characteristics are based on an analysis of the measured voltage and/or current at the PCC and/or at the output terminal of the energy production units.

Advantageously, the harmonics of the output power of the power plant is determined on an analysis, such as a Fourier analysis, of the measured voltage and/or current.

A second aspect of the invention relates to a power plant controller PPC configured to perform a method for damping harmonics of a power output of a power plant at a point of common coupling PCC between the power plant and a utility grid, wherein the power plant comprises a plurality of energy production units, the method comprising determining an electrical characteristic at the point of common coupling determining the electrical characteristic at an output terminal of each of the energy production units, and dispatching a control signal to at least one of the energy production units to control said electrical characteristic at an output terminal of the respective energy production units, wherein said control signal is based on the measurement of the electrical characteristic at the point of common coupling and arranged for damping the harmonic of the power output of the power plant at the point of common coupling.

In the present context, a number of terms are used in a manner being ordinary to the skilled person. Some of these terms are detailed below:

P is preferably used to mean/denote active power.

Q is preferably used to mean/denote reactive power.

H is preferably used to mean/denote harmonic power.

S is preferably used to mean/denote apparent power.

PPC is preferably used to mean/denote Power Plant Controller.

THD is preferably used to mean/denote Total Harmonic Distortion.

$HD_i$ is preferably used to mean/denote the i th Harmonic Distortion.

$U_{Hi\_MEAS}$ is preferably used to mean/denote the measured i th harmonic voltage.

$I_{Hi\_MEAS}$ is preferably used to mean/denote the measured i th harmonic current.

$I_{Hi\_REF}$ is preferably used to mean/denote the total i th harmonic current reference.

TSO is preferably used to mean/denote Transmission System Operator or utility grid operator.

STATCOM is preferably used to mean/denote Static Synchronous Compensator.

MSU is preferably used to mean/denote Mechanical Switch Unit.

ES is preferably used to mean/denote Energy Storage.

WPP is preferably used to mean/denote Wind Power Plant.

WTG is preferably used to mean/denote Wind Turbine Generator.

$P_{WTG}$ is preferably used to mean/denote each wind turbine generator's active power.

$Q_{WTG}$ is preferably used to mean/denote each wind turbine generator's reactive power.

$I_{H,WTG}$ is preferably used to mean; denote each wind turbine generators harmonic current.

$I_{Hx,WTG1}, I_{Hx,WTG2} \ldots I_{Hx,WTGi}$ (x=3,5,7, . . . )$_i$ is preferably used to mean/denote the Harmonic Current Set Points.

$\Delta H$ is preferably used to mean/denote the difference between $H_{REF}$ and $H_{MEAS}$.

EC_WTGi is preferably used to mean/denote the electrical characteristic determined at the wind turbines output terminal, preferably the harmonics of the output power at the output terminals.

EC_PCC is preferably used to mean/denote the electrical characteristic determined at the PCC, preferably the harmonics of the output power at the PCC.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE FIGURES

The figures show one way of implementing the present invention and is not to be construed as being limiting to other possible embodiments falling within the scope of the attached claim set.

FIG. 4 schematically illustrates a prioritizing scheme according to an embodiment.

DETAILED DESCRIPTION OF AN EMBODIMENT

Figure 1:
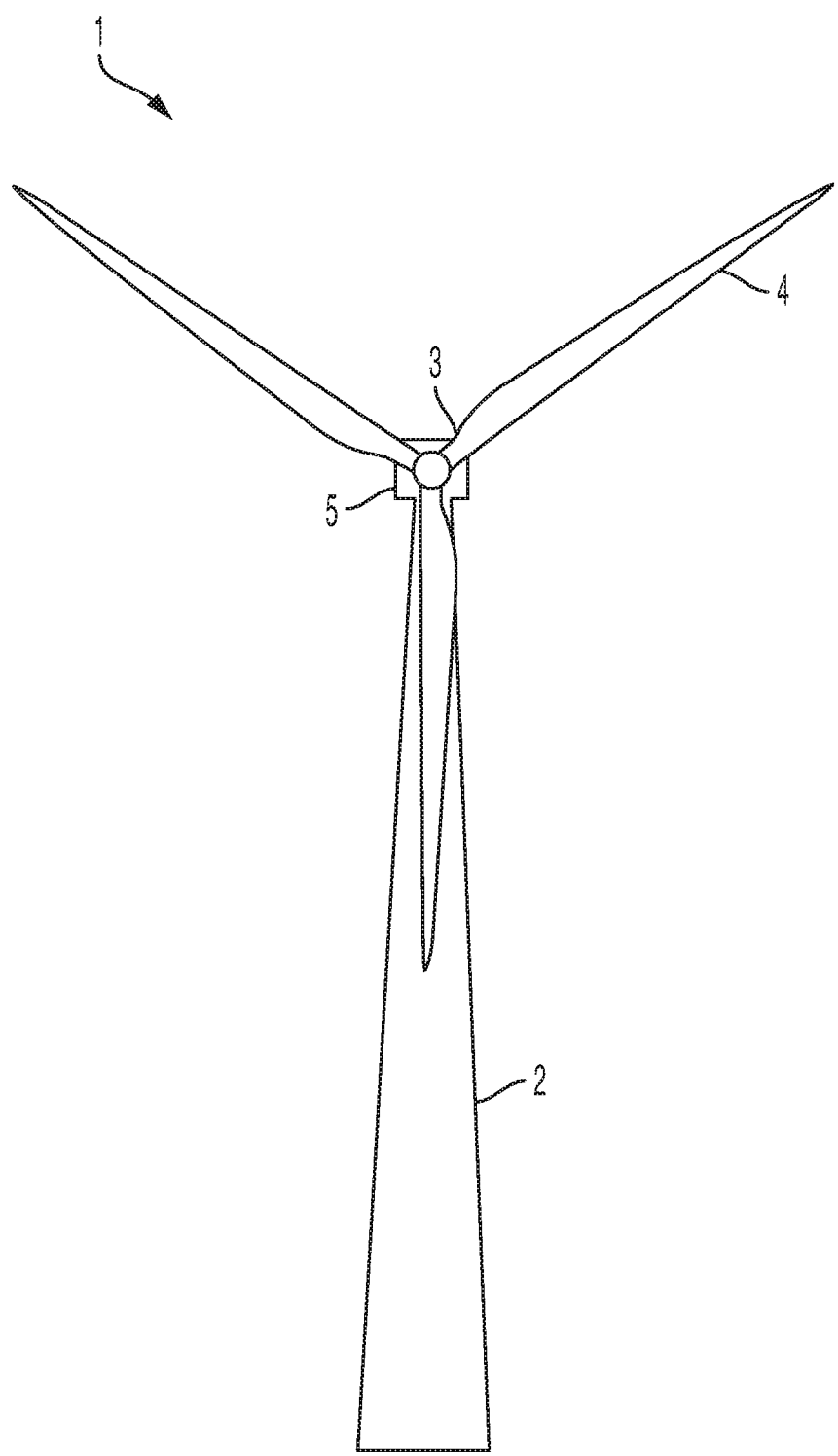
FIG. 1 schematically illustrates a wind turbine.

FIG. 1 shows a wind turbine generator WTG 1 comprising a tower 2 and a rotor 3. The rotor comprises three rotor blades 4. However, the number of blades may vary, and there may be two, four or even more blades. The rotor 3 is connected to a nacelle 5, which is mounted on top of the tower 2, and is arranged to drive an electrical generator situated inside the nacelle. The rotor 3 is rotatable by action of the wind. The wind-induced rotational energy of the rotor blades 4 is transferred via a shaft to the electrical generator. Thus, the WTG 1 is capable of converting kinetic energy of the wind into mechanical energy by means of the rotor blades 4 and, subsequently, into electric power by means of the electrical generator. The electrical layout of the WTG 1 may in addition to the electrical generator include a power converter. The power converter is connected in series between the electrical generator and the electrical grid for converting the variable frequency generator AC power into a grid frequency AC power to be injected into the utility/electrical grid. The electrical generator is via the power converter controllable to produce a power corresponding to a power request. Here the WTG can be, but not limited to, a full scale turbine or a doubly-fed induction generator turbine (DFIG).

The blades 4 can be pitched in order to alter the aerodynamic properties of the blades, e.g. in order to maximize uptake of the wind energy. The blades 4 are pitched by a pitch system, which includes actuators for pitching the blades dependent on a pitch request.

A WTG is, in normal operation, set to capture as much power from the wind, at any given wind speed. This works as long as the power production is below the rated power limit for the wind turbine, i.e. partial load operation. When the wind speed increases above rated wind speed, often designed at 10-12 m/s, the WTG has to pitch the blades 4, so the energy captured is stable at rated power, even if the wind is well above rated wind speed.

Figure 2:
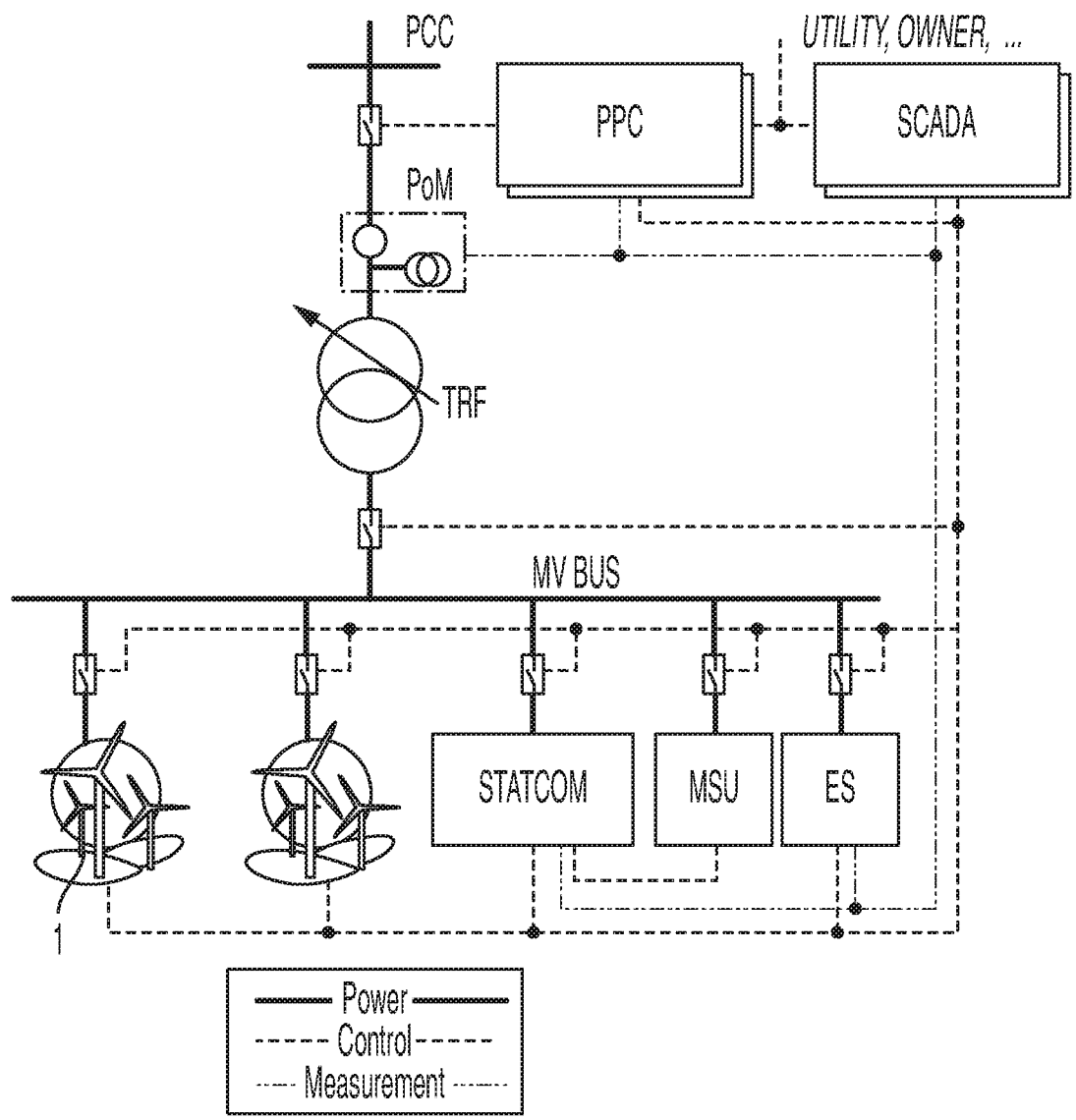
FIG. 2 schematically illustrates a generic wind power plant architecture.

A wind power plant WPP comprises a plurality of WTGs controlled by a power plant controller PPC and interconnection infrastructure. FIG. 2 shows an example of a generic WPP architecture with a plurality of WTGs, a collection grid with a MV collection bus, a transformer TRF. At the high voltage side of the transformer there is a Point of Measurement PoM, close to the Point of Common Coupling PCC. Between the PCC and the TRF a power plant circuit breaker or a switch gear is installed and is operated by the PPC, in order for system operators to disconnect the WPP from the grid.

From the WTGs to the PCC there may be several electrical infrastructure components, e.g. power cables etc. All the components are needed, but they contribute to losses from the WTGs to the PCC. Losses which have to be taken into account when controlling the WPP.

The measurements obtained at the PoM are communicated to the PPC and optionally also to a SCADA system. The SCADA is optional and is not necessarily interacting with embodiments of the present invention. Based on the measurements, the PPC controls the WTGs accordingly. Further optional equipment is also shown, such as a STATCOM, MSU (Mechanically Switched Unit, wherein the unit can be either capacitors or inductors), ES (Energy Storage) all used for improving power quality and stability.

In an embodiment the Power Plant Controller PPC has the responsibility to control active power P and reactive power Q at the point of common coupling with the utility grid. The P and Q quantities are the means by which other system parameters can be influenced, such as the grid frequency f and voltage V. The controller structure has as inner loops the P and Q control, and has as outer loops the f and V control.

Besides the core functionalities described above, the PPC may also be responsible for other WPP functionalities, required either by the Transmission System Operator TSO or by the WPP owner.

The active power control loop is responsible for controlling P at the point of common coupling. This inner loop can be used to influence the grid frequency, by adding appropriate external control loops (e.g. primary frequency regulation and fast frequency response). Power oscillation damping can be achieved as well by adding an appropriate external control loop.

Figure 3:
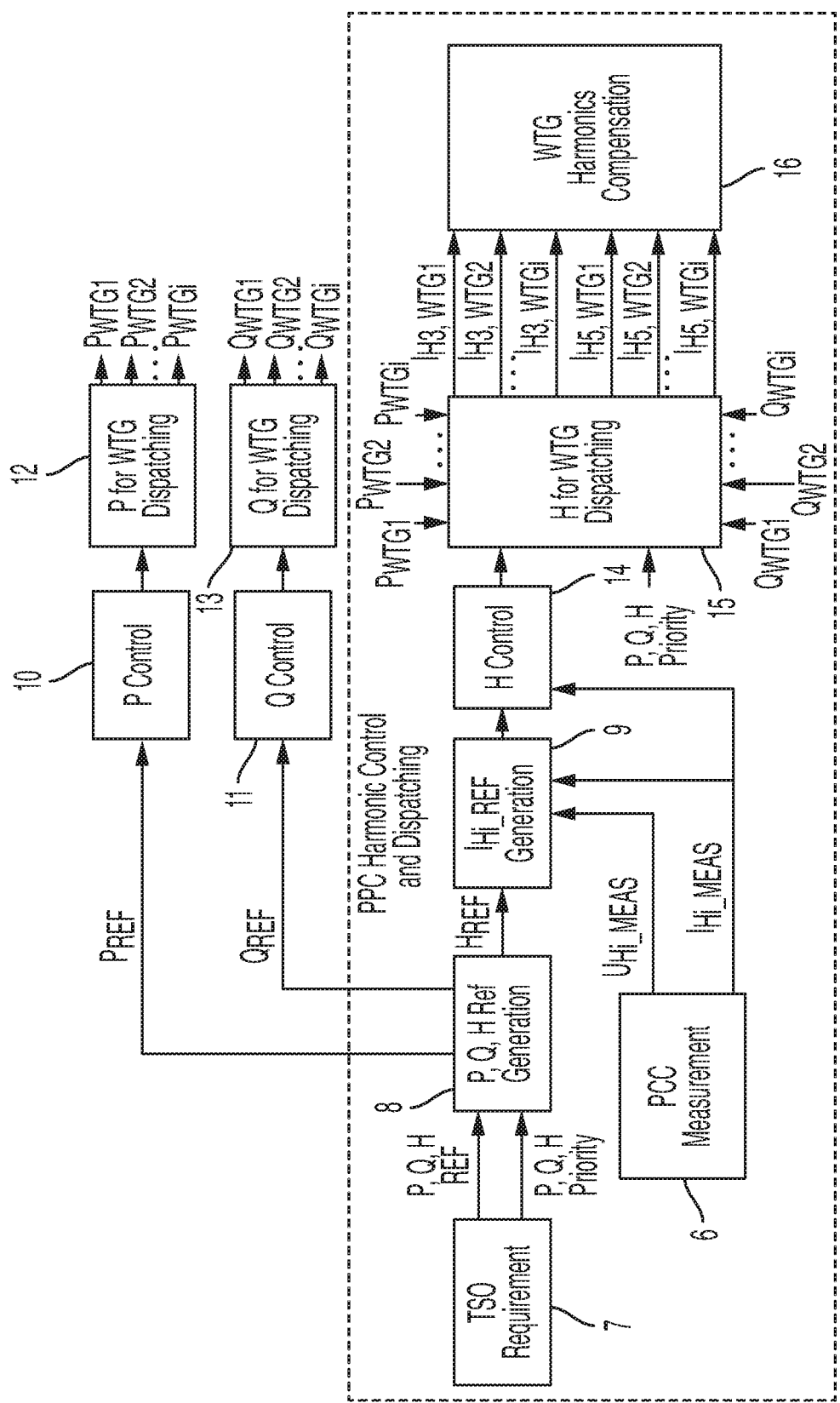
FIG. 3 schematically illustrates an embodiment of a method for damping harmonics at the output of a power plant comprising a plurality of wind turbines.

FIG. 3 shows the general concept of PPC harmonic control and dispatching method according to the present invention.

A power meter measures the harmonic voltage $U_{Hi\_MEAS}$ and Harmonic Current $I_{Hi\_MEAS}$ at the PCC and the PPC internally dispatches the signals to the Current Reference Generator 9 and to the Harmonic Current H Controller 14. The method determines the electrical characteristic EC_PCC, which may be the harmonics H of the output power of the power plant, based on an analysis, such as a Fourier analysis, of the measured voltage and/or current at the PCC. The method determines the electrical characteristics EC_WTGi, which may be the harmonics of the output power of the plurality of the WTGs, based on an analysis, such as a Fourier analysis, of the measured voltage and/or current at the output terminal of the WTGs.

The TSO 7 sends (P, Q, H) references and (P, Q, H) priorities to the P, Q, H reference Generator 8. Based on different grid demands, the PPC select different priorities among P, Q and H. Disregarding which quantity has the highest or second or lowest priority, the three quantities P, Q and H respects the relationship $P^2+Q^2+H^2=S^2$. The PPC may be set up with a prioritizing sequence as requested by the TSO or as needed by operations. The prioritizing scheme is illustrated in FIG. 4. The prioritizing scheme 4 discloses situations "a"-"f" in the first column, each situation corresponding to a specific prioritization of the three quantities P, Q and H. The second column discloses each situation's prioritizing of the three quantities P, Q and H. The third column illustrates the calculation of the $H_{ref}$, which is either calculated based on the P reference and Q reference or provided by the ISO or operator. The fourth column discloses information on the origin of two of the three quantities and the calculation of the third quantity.

The P, Q, H Reference Generator 8 calculates the H reference $H_{REF}$ on the basis of a prioritizing sequence scheme. According to different orders of priority of the quantities P, Q and H, the $H_{REF}$ is either calculated by the P, Q, H Reference Generator 8 or given by the TSO. For example, if P is prioritized over Q and over H (situation "a" in the prioritizing scheme), the P and Q references are given by the TSO or operator and $H_{REF}$ is calculated with $H=\sqrt{S^2-P^2-Q^2}$. In situation "e", the H and P references are given by the TSO or operator, and the Q reference is calculated with $Q=\sqrt{S^2-P^2-H^2}$. The output in any of the situations "a-f" in the prioritizing scheme is the H reference $H_{REF}$ on plant level.

In situations "b", "d", "e" and "f" where $H_{REF}$ is given from the TSO, the P, Q, H Reference Generator 8 calculates the Q reference or P reference, so as to fulfill the $H_{REF}$ requirement from the TSO and respect the relationship $P^2+Q^2+H^2=S^2$. The P reference and Q references are dispatched to the P Controller 10 and Q Controller 11 and subsequently to the $P_{WTG}$ Dispatching Controller 12 and $Q_{WTG}$ Dispatching Controller 13 for dispatching P and Q set points to the WTGs. The $H_{REF}$ signal is dispatched to the Current Reference Generator 9.

In situations "a" and "c", the calculation of $H_{REF}$ is based on the P reference and Q reference e.g. provided by the TSO or operator. The $H_{REF}$ signal is dispatched to the Current Reference Generator 9.

The input of the Current Reference Generator 9 is the $H_{REF}$, which is the output from any of the situations in the prioritizing scheme. The control signal, or set points, sent to the WTGs are Harmonic Current Set Points: $I_{Hx,WTG1}$, $I_{Hx,WTG2}$ ... $I_{Hx,WTGi}$, (x=3,5,7 ... ). Methods of defining/calculating the Harmonic Order Current Reference $\Delta I_{Hi}$ are required to generate the Plant Level Harmonics Current Reference $I_{H1\_WTG}$; $I_{H2\_WTG}$ ... $I_{Hi\_WTG}$.

The Current Reference Generator 9 may use two methods for calculating the Harmonic Order Current Reference $\Delta I_{Hi}$.

Method I:

The Current Reference Generator 9 receives Harmonic Current Reference command $I_{Hi\_REF}$ from the TSO. The $I_{Hi\_REF}$ is by default set as 0, meaning that the PPC ideally controls the total output harmonic current at the PCC to 0 $\sqrt{\Sigma_i H_{WTGi}}=0$. In method I, the $H_{REF}$ acts as a saturation factor to limit the Harmonic Order Current Reference $\Delta I_{Hi}$.

Figure 5:
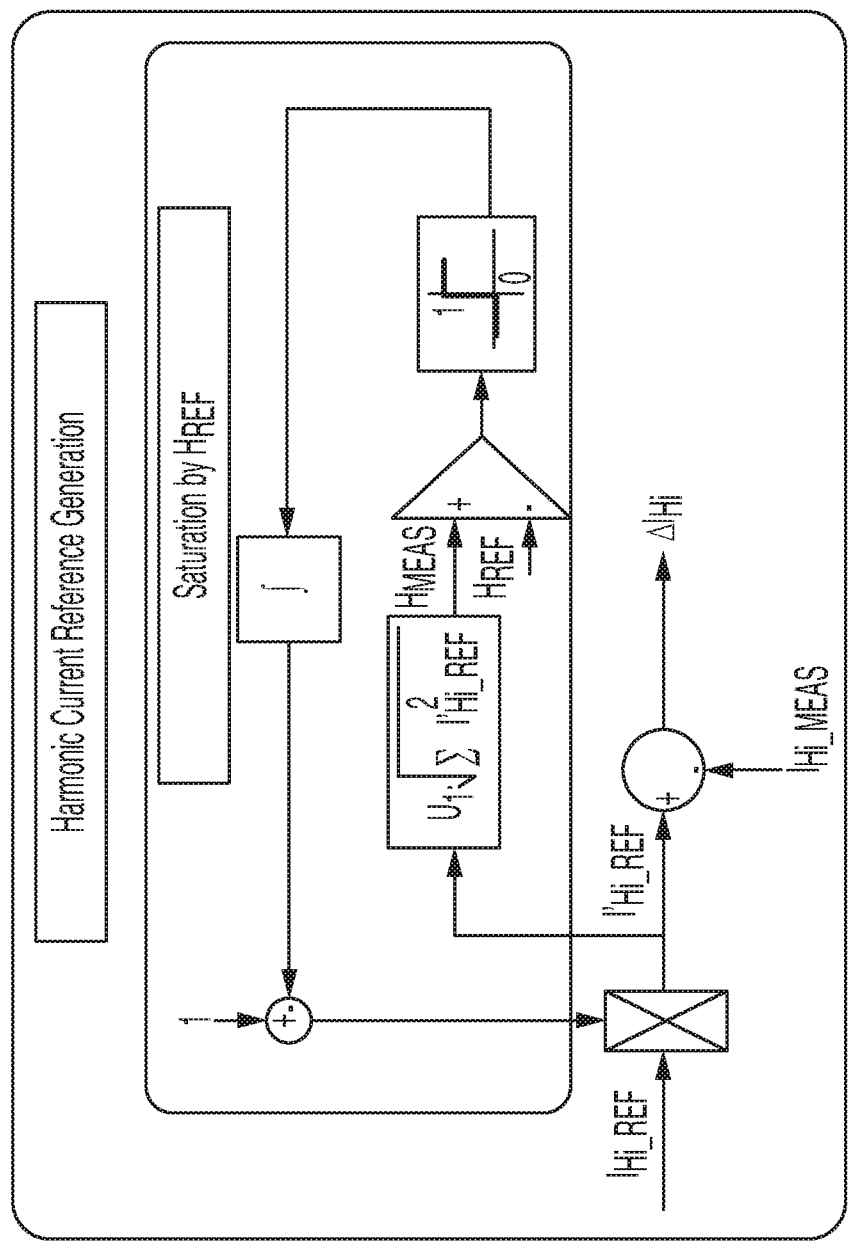
FIG. 5 schematically illustrates the calculation of a Harmonic Order Current Reference according to an embodiment.

FIG. 5 schematically illustrates the calculation of the Harmonic Order Current Reference $\Delta I_{Hi}$ according to method I.

Figure 6:
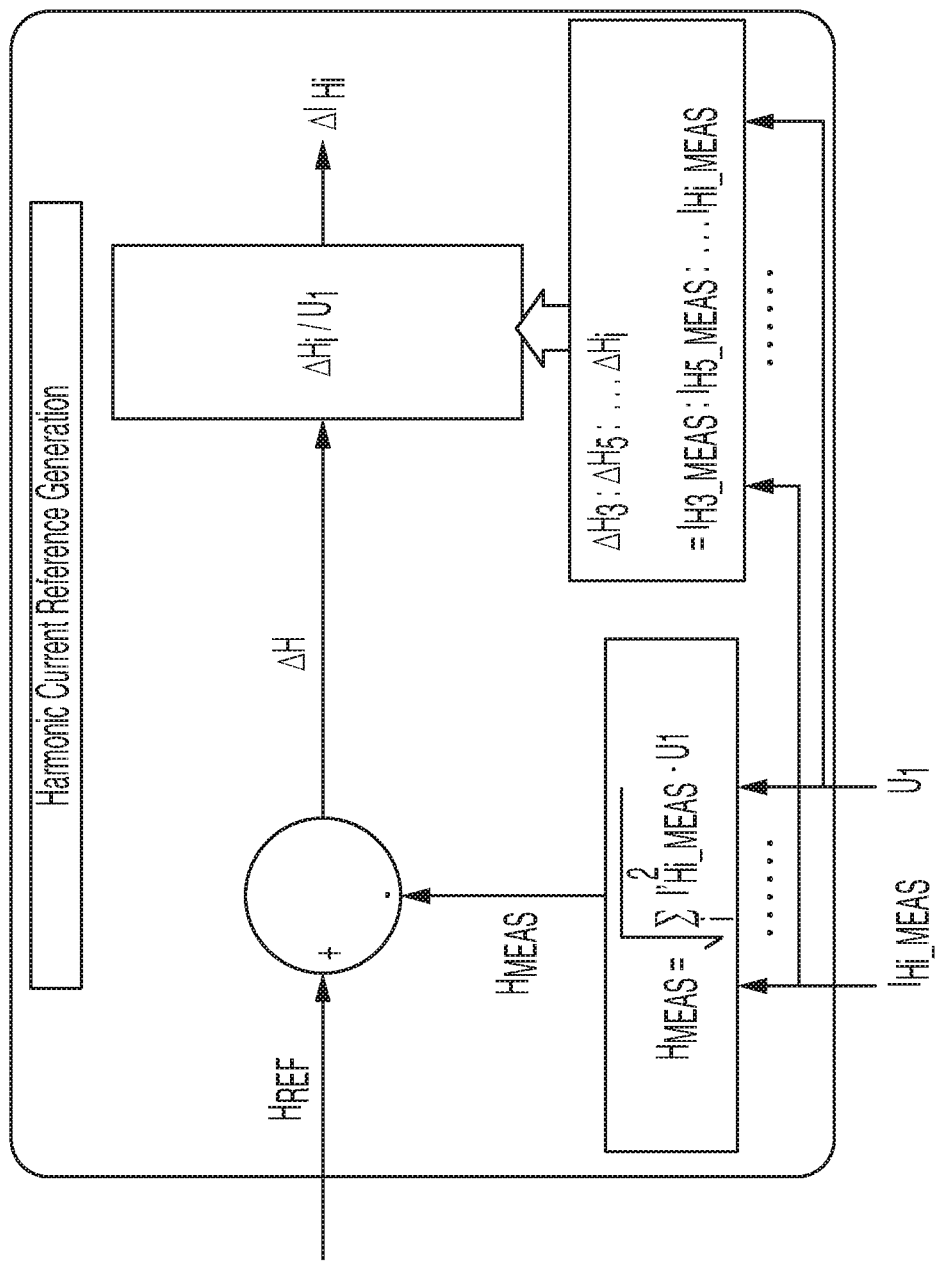
FIG. 6 schematically illustrates the calculation of the Harmonic Order Current according to another embodiment.

Method II:

The Current Reference Generator 9 compares the $H_{REF}$ with the Total Measured Harmonics $H_{MEAS}$. The Total Measured Harmonics $H_{MEAS}$ is calculated by: $H_{MEAS} = \sqrt{\Sigma_i I_{Hi\_Meas}^2} * U_1$; U1 being the fundamental voltage component and $I_{Hi\_MEAS}$ being the i th harmonic current measured. The difference between $H_{REF}$ and $H_{MEAS}$, ($\Delta H$), is used to generate the Harmonic Order Current Reference $\Delta I_{Hi}$, in which the ratio among all harmonics are used to split the $\Delta H$. FIG. 6 schematically illustrates the calculation of $\Delta I_{Hi}$ according to method II.

Figure 7:
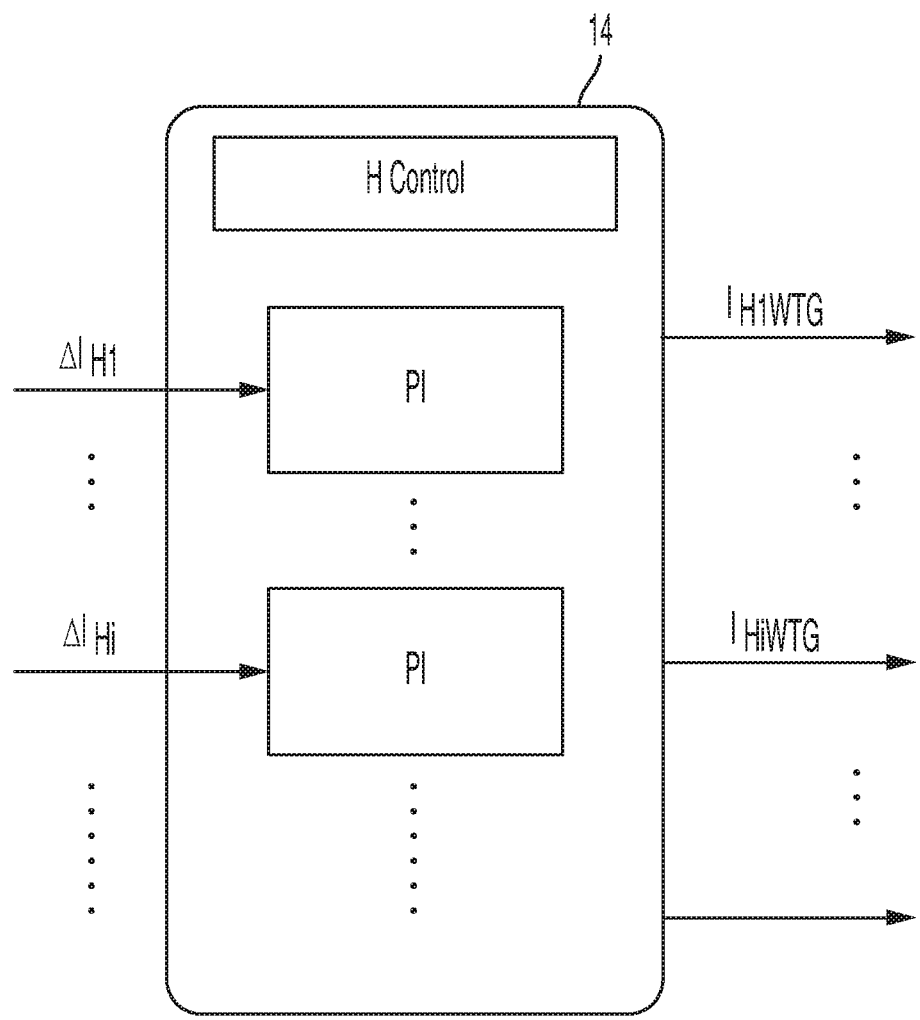
FIG. 7 schematically illustrates a Harmonic Current H Controller according to an embodiment.

FIG. 7 schematically illustrates the functionality of the Harmonic Current H Controller 14. The input to the H Controller 14 is the $\Delta I_{Hi}$ from the Current Reference Generator 9. PI controllers (Proportional-Integral Controller) or alternatively a PID (Proportional-Integral-Derivative Controller) may be used for each harmonic, in order to eliminate the $\Delta I_{Hi}$. The output of the H Controller 14 is the Plant Level Harmonics Current Reference $I_{H1\ WTG}$; $I_{H2\ WTG}$ ... $I_{Hi\ WTG}$, which is subsequently dispatched to the WTG Dispatching Block 15.

The WTG dispatching block 15 is schematically illustrated in FIG. 3. The WTG dispatching block 15 is used to generate the control signal to the WTGs, comprising Harmonics Current Set Points $I_{Hx,WTG1}$, $I_{Hx,WTG2}$ ... $I_{Hx,WTGi}$, (x=3,5,7 ... ) The WTG dispatching block 15 receives input $P_{WTG1}$; $P_{WTG2}$ ... $P_{WTGi}$ and $Q_{WTG1}$; $Q_{WTG2}$ ... $Q_{WTGi}$ from the $P_{WTG}$ Dispatching Controller 12 and $Q_{WTG}$ Dispatching Controller 13 respectively, and (P, Q, H) priorities from the TSO. The dispatching can be performed according to each wind turbines operating condition and (P, Q, H) prioritizing order. As an example, if TSO requires P over Q, and Q over H (situation "a" in the prioritizing scheme), the Plant Level Harmonics Current Reference $I_{H1\ WTG}$; $I_{H2\ WTG}$ ... $I_{Hi\ WTG}$ is calculated and prioritized in accordance with the remaining capability of each wind turbine after regulating the P and Q quantities (electrical characteristic EC_WTGi) of the wind turbines. One principle is that the same WTG should not be requested to generate certain order of harmonics all the time. The output of the WTG dispatching block 15 is the control signal, comprising Harmonic Current Set Points $I_{Hx,WTG1}$, $I_{Hx,WTG2}$ ... $I_{Hx,WTGi}$, (x=3,5,7 ... ), which are dispatched to the WTGs.

The WTG Harmonics Compensation block 16 represent the inside of the WTGs, when the WTGs receives the Harmonic Current Set Points $I_{Hx,WTG1}$, $I_{Hx,WTG2}$ ... $I_{Hx,WTGi}$, (x=3,5,7 ... ). The WTGs executes the command by using its own compensation algorithm.

Figure 8:
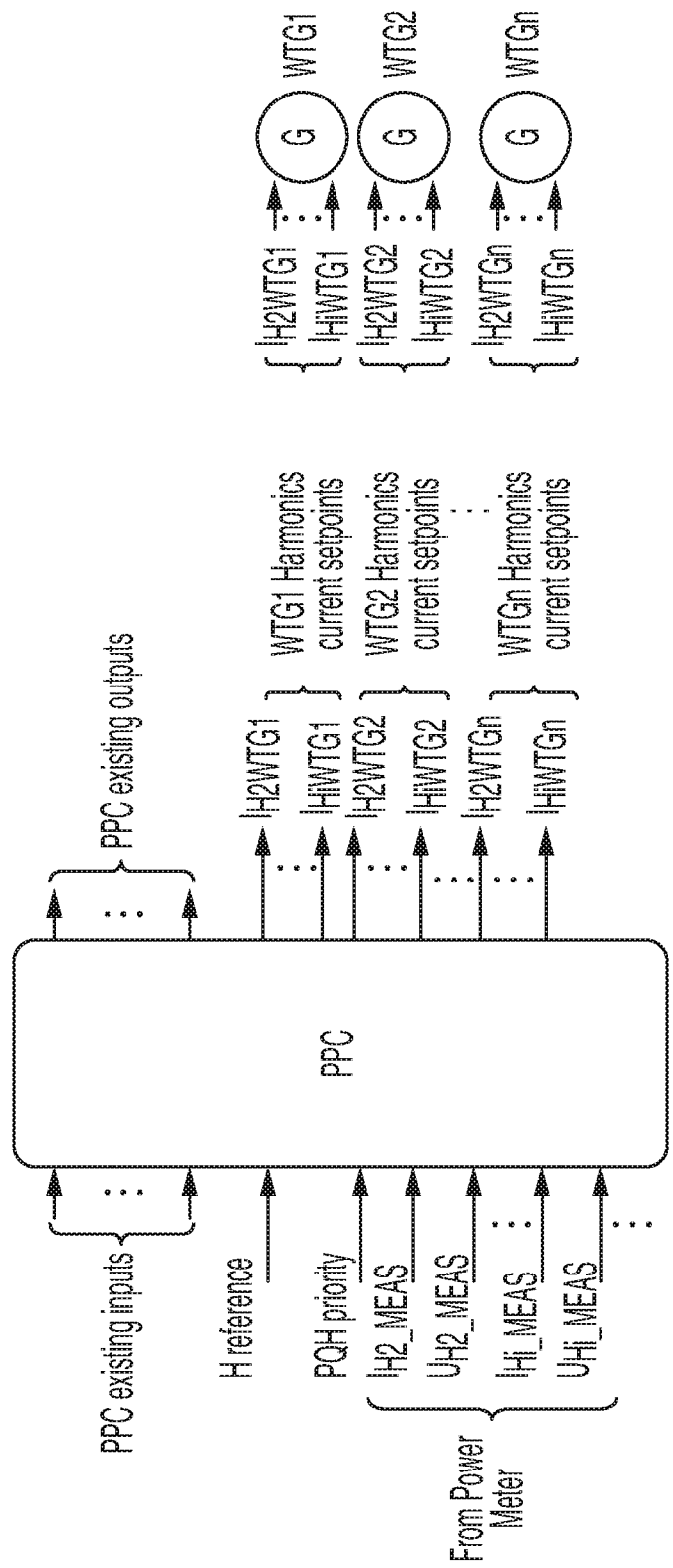
FIG. 8 schematically illustrates a PPC according to an embodiment.

The method according to present invention can be implemented in the PPC software. In FIG. 8 the "PPC existing inputs" and "PPC existing outputs" schematically illustrates the existing signals in the PCC, which includes active and reactive power set points dispatched to the WTGs. The $H_{REF}$, P, Q, H priority, $I_{H2\_MEAS}$, $U_{H2\_MEAS}$, $I_{Hi\_MEAS}$ and $U_{Hi\_MEAS}$ schematically illustrates the new inputs and outputs of the PPC. In the illustrative example in FIG. 8 there are n WTGs in a power plant.

It is noted that the wind turbines should be adapted to handle the received Harmonics Current Set Points and regulate the harmonics accordingly. Thus software for doing so should be present in the WTGs. Preferably, the wind turbines' grid side converter controller are adapted to execute a harmonics compensation algorithm.

A power meter may be used to execute the harmonics calculation in order to obtain the harmonics measurements for the PPC. Implemented software in the PPC may be used to execute the $H_{REF}$ calculation and control algorithm and dispatching algorithm.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for damping harmonics of a power output of a power plant at a point of common coupling between the power plant and a utility grid, wherein the power plant comprises a plurality of energy production units, the method comprising:
  determining a total harmonic distortion of the power plant at the point of common coupling, wherein the total harmonic distortion is a sum of harmonic root mean square (RMS) voltage or harmonic RMS current of the plurality of energy production units;
  determining harmonics of the output powers of the plurality of energy production units at output terminals of the energy production units;
  determining a control signal, based on the total harmonic distortion of the power plant, the harmonics of the output powers of the plurality of energy production units, and a predetermined prioritizing sequence that prioritizes one of active power, reactive power, or harmonics; and
  dispatching the control signal to at least one of the energy production units to control the harmonics of the output powers of the plurality of energy production units at the output terminals of the plurality of energy production units such that the total harmonic distortion of the power plant at the point of common coupling is reduced.

2. The method for damping harmonics according to claim 1, wherein the prioritizing sequence comprise prioritizing active power over reactive power and harmonics of the power output at the point of common coupling.

3. The method for damping harmonics according to claim 1, wherein the prioritizing sequence comprise prioritizing reactive power over active power and harmonics of the power output at the point of common coupling.

4. The method for damping harmonics according to claim 1, wherein the prioritizing sequence comprise prioritizing harmonics of the power output over active power and reactive power at the point of common coupling.

5. The method for damping harmonics according to claim 1, wherein the control signal is further determined on the basis of a harmonic current reference.

6. The method for damping harmonics according to claim 5, wherein the control signal is further determined on the basis of a measured harmonic current reference.

7. The method for damping harmonics according to claim 1, wherein the control signal is determined by use of a PI controller.

8. The method for damping harmonics according to claim 1, wherein the control signal comprises a current set point, so as to control one or more harmonic orders of the harmonics, at an output terminal of at least one of said energy production units.

9. The method for damping harmonics according to claim 8, wherein a dispatching block is configured for generating said control signal, said control signal comprising said current set point, so as to control one or more harmonic orders of the harmonics, at an output terminal of at least one of said energy production units.

10. The method for damping harmonics according to claim 9, wherein said dispatching block is configured for receiving input from a dispatching controller and from said prioritizing sequence.

11. The method for damping harmonics according to claim 1, wherein the energy productions units comprise at least one of wind turbine generators, or photovoltaic cells.

12. The method for damping harmonics according to claim 1, further comprising measuring at least one of reactive power, active power, voltage, current, or power factor at the point of common coupling or at the output terminal of each of the energy production units.

13. The method for damping harmonics according to claim 12, wherein the total harmonic distortion is based on an analysis of the measured voltage or current at the point of common coupling or at the output terminal of the energy production units.

14. A wind farm, comprising:
a plurality of wind turbine generators;
a power plant controller communicatively coupled to the plurality of wind turbine generators and configured to perform an operation for damping harmonics of a power output of the wind farm at a point of common coupling between the wind farm and a utility grid, wherein the operation, comprises:
determining a total harmonic distortion of the wind farm at the point of common coupling, wherein the total harmonic distortion is a sum of harmonic root mean square (RMS) voltage or harmonic RMS current of the plurality of wind turbine generators;
determining harmonics of the output powers of the plurality of wind turbine generators at output terminals of each of the wind turbine generators;
determining a control signal, based on the total harmonic distortion of the wind farm, the harmonics of the output powers of the plurality of wind turbine generators, and a predetermined prioritizing sequence that prioritizes one of active power, reactive power, or harmonics; and
dispatching the control signal to at least one of the wind turbine generators to control the harmonics of the output powers of the plurality of wind turbine generators at the output terminals of the plurality of wind turbine generators such that the total harmonic distortion of the wind farm at the point of common coupling is reduced.

15. The wind farm of claim 14, wherein the prioritizing sequence comprise prioritizing active power over reactive power and harmonics of the power output at the point of common coupling.

16. The wind farm of claim 14, wherein the prioritizing sequence comprises prioritizing reactive power over active power and harmonics of the power output at the point of common coupling.

17. The wind farm of claim 14, wherein the prioritizing sequence comprise prioritizing harmonics of the power output over active power and reactive power at the point of common coupling.

18. The wind farm of claim 14, wherein the control signal is further determined on the basis of a harmonic current reference.

19. The wind farm of claim 18, wherein the control signal is further determined on the basis of a measured harmonic current reference.

20. The wind farm of claim 14, wherein the control signal is determined by use of a PI controller.

* * * * *